United States Patent
DeLean

(10) Patent No.: US 9,472,082 B2
(45) Date of Patent: Oct. 18, 2016

(54) VISION BASED SYSTEM FOR DETECTING DISTRESS BEHAVIOR

(71) Applicant: Bruno DeLean, Andorra La Vella (ID)

(72) Inventor: Bruno DeLean, Andorra La Vella (ID)

(*) Notice: Subject to any disclaimer, the term of this patent is extended or adjusted under 35 U.S.C. 154(b) by 92 days.

(21) Appl. No.: 14/312,266

(22) Filed: Jun. 23, 2014

(65) Prior Publication Data
US 2015/0371520 A1  Dec. 24, 2015

(51) Int. Cl.
G06K 9/00 (2006.01)
G08B 21/04 (2006.01)
G06T 7/20 (2006.01)
G08B 5/00 (2006.01)

(52) U.S. Cl.
CPC ....... *G08B 21/0415* (2013.01); *G06K 9/00342* (2013.01); *G06K 9/00369* (2013.01); *G06T 7/204* (2013.01); *G08B 5/002* (2013.01); *G08B 21/0476* (2013.01); *G06K 9/00771* (2013.01); *G06K 2009/00738* (2013.01); *G06T 2207/10016* (2013.01); *G06T 2207/20076* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 7,530,951 B2* | 5/2009 | Fehre | ...... | A61B 8/08 600/437 |
| 7,798,963 B2* | 9/2010 | White | ...... | A61B 5/0402 600/437 |
| 8,229,068 B2* | 7/2012 | Lu | ...... | A61N 5/1049 378/65 |
| 9,082,278 B2* | 7/2015 | Park | ...... | G06K 9/00771 |
| 2005/0113673 A1* | 5/2005 | Avinash | ...... | A61B 5/055 600/413 |
| 2005/0283068 A1* | 12/2005 | Zuccolotto | ...... | A61B 5/0555 600/410 |
| 2008/0284580 A1* | 11/2008 | Babich | ...... | G08B 13/19684 340/502 |
| 2011/0144517 A1* | 6/2011 | Cervantes | ...... | A61B 5/08 600/538 |
| 2011/0228092 A1* | 9/2011 | Park | ...... | G06K 9/00771 348/154 |
| 2013/0211236 A1* | 8/2013 | Beck | ...... | G01R 33/5673 600/413 |
| 2015/0371520 A1* | 12/2015 | DeLean | ...... | G08B 21/0415 382/103 |

* cited by examiner

*Primary Examiner* — Tahmina Ansari
(74) *Attorney, Agent, or Firm* — Fogg & Powers LLC

(57) ABSTRACT

A system and method for detecting a distress condition of a person in a monitored location. The system is configured to receive an image stream of the monitored location, and detect a human body or body part within the monitored location. The system maintains and updates a list of areas in which the lack of movement is permitted, e.g., bed, sofa, chairs. Upon detecting that the person is no longer moving and exists in a new area that is not in the list of areas, the system enters into an acknowledgement session in which the system asks the person to perform a certain action if everything is fine. If the given action is detected within a pre-determined period the system updates the list of areas to add the new area therein, otherwise the system would execute a pre-defined function representing a response to the distress condition, e.g., call 911.

20 Claims, 12 Drawing Sheets

345-1  345-2  345-3  345-4

345-5  345-6  345-7

VISION BASED SYSTEM FOR DETECTING DISTRESS BEHAVIOR

BACKGROUND (a) Field

The subject matter disclosed generally relates to a vision based systems for detecting distress behavior.

(b) Related Prior Art

There is a need for a mechanism which allows for monitoring people, especially the elderly, for detecting a situation of distress and performing some call for help.

Attempts have been made to address this problem. The most basis systems use video surveillance and require another person to continuously watch the video stream at a remote location to report and/or perform the call for help when a distress situation occurs. However, this system is impractical for several reasons including costs, privacy and accuracy. In particular, the costs associated with hiring a person who is performing the watching. Additionally, there are privacy issues associated with these systems because many people feel uncomfortable to be constantly watched by someone in the privacy of their home. The accuracy is the last but not the least of the problems because when the person is watching constantly, it is very easy to miss an event especially if the monitored person is sitting or sleeping and suffers, e.g., a sudden heart attack.

Other systems require the monitored person to carry some sort of device including a button which when pressed triggers a call for help or the intervention of someone. These systems have their limitations too because often when the distress condition occurs the person would no longer have the ability or power to press the button. These devices are not possible to use with people having mental illnesses or memory problems.

Therefore, there remains a need in the market for a monitoring system which addresses the above noted problems.

SUMMARY

The present embodiments describe such system.

In one aspect, there is provided a vision-based computer implemented method for detecting a distress condition in a monitored location, the method comprising: receiving images of the monitored location; detecting a human body or body part in said images; detecting a movement activity of the human body or the body part in two or more successive images; detecting a current location of said movement activity in said images; detecting a lack of movement of said human body or body part for a first pre-determined period in the current location, after detecting said movement activity; comparing the current location to a list of approved locations in which the lack of movement is acceptable; if the current location is absent from the list of approved locations requesting the human body to perform a given action; and if the given action is detected within a second pre-determined period updating the list, otherwise executing a function representing a response to the distress condition.

In an embodiment, requesting comprises generating an audio request using a speaker.

In another embodiment, detecting a lack of movement comprises detecting the human body or body part at the same position in two or more successive images.

In a further embodiment detecting a lack of movement further comprises performing a drift analysis by comparing successive images on a pixel level to detect presence or absence of a breathing movement.

In yet a further embodiment requesting comprises generating a visible request using a display device.

In an embodiment, the given action may be a pronunciation of selected words or tone, the method further comprising receiving an audio signal and processing said audio signal to determine if the audio signal contains the selected words or tone. In another embodiment, the given action may be a gesture, the method further comprising searching for said gesture in said images.

In an embodiment, receiving images of the monitored location comprises receiving two-dimensional (2D) images of the monitored location. In another embodiment, receiving images of the monitored location comprises receiving a video clip of the monitored location, the video clip comprising a plurality of 2D images.

Detecting a human body or body part may comprise comparing a given image of the monitored location with a pre-loaded image of the same or another human body or body part. The method may further comprise converting the given image and the pre-loaded image to a binary format; dividing the given image into different portions; performing a sum of square difference (SSD) between the pre-loaded image and different versions of each portion of the given image, each version having a different resolution, to produce a set of SSD values including m SSD values; classifying the set of SSD values as a candidate sample in an m-dimensional space including YES samples representing images showing a human body or body part, and NO samples not showing a human body or body part; calculating a probability that the portion includes a human body or body part based on a number of YES samples and NO samples within a pre-defined m-dimensional volume around the candidate sample; and outputting the position of the human body or body part within the given image if the probability is higher than a predetermined threshold.

In another aspect, there is provided a vision-based computer implemented method for detecting a distress condition in a monitored location, the method comprising receiving images of the monitored location; detecting a human body or body part in one or more of said images; detecting a movement of said human body or body part in two or more successive images; detecting a lack of movement of said human body or body part for a first pre-determined period, after detecting said movement; requesting the human body or body part to perform a given action; monitoring detection of the given action for a second pre-determined period; selecting a function to execute based on a result of the monitoring; and executing the selected function.

In an embodiment detecting a lack of movement comprises detecting the human body or body part at the same position in two or more successive images. In another embodiment the method may further comprise, if the given action is detected, the selected function comprises marking an area surrounding the human body or body part such that if the lack of movement is detected again in that area, no further request is made to the human body or body part to perform the given action.

The method may include performing a drift analysis including comparing successive images at a pixel level to detect presence or absence of a life indicating movement. The life indicating movement may include one or more of: breathing movement in a chest area and movement of body parts.

In an embodiment, the method may include if the given action is not detected, selecting one or more functions representing a response to the distress condition, and executing said functions.

The method may also include associating a delay of absence with a given aperture/door; detecting disappearance of the human body within said aperture/door; setting the first predetermined period to be to be the delay of absence associated with the aperture.

In a further aspect there is provided a system for detecting a distress condition in a monitored location, the computing device comprising: a processor operably connected to a memory device having recorded thereon computer readable statements and instructions which when executed by the processor cause the processor to perform the steps of: receiving images of the monitored location; detecting a human body or body part in said images; detecting a movement activity of the human body or the body part in two or more successive images; detecting a current location of said movement activity in said images; detecting a lack of movement of said human body or body part for a first pre-determined period in the current location, after detecting said movement activity; comparing the current location to a list of approved locations in which the lack of movement is acceptable; if the current location is absent from the list of approved locations requesting the human body to perform a given action; and if the given action is detected within a second pre-determined period updating the list, otherwise executing a function representing a response to the distress condition.

The given action may be a pronunciation of selected words or tone, the system being adapted to receive an audio signal and process said audio signal to determine if the audio signal contains the selected words or tone.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The embodiments describe a system and method for detecting a distress condition of a person in a monitored location. The system is configured to receive an image stream of the monitored location, and detect a human body or body part within the monitored location. The system maintains and updates a list of areas (within the monitored location) in which the lack of movement is permitted, e.g., bed, sofa, chairs. The system may monitor the movement/behavior of the detected person. Upon detecting that the person is no longer moving and exists in a new area that is not in the list of areas, the system enters into an acknowledgement session in which the system asks the person to perform a certain action if everything is fine. If the given action is detected within a pre-determined period the system updates the list of areas to add the new area therein, otherwise the system would execute a pre-defined function representing a response to the distress condition, e.g., call 911.

Figure 1:
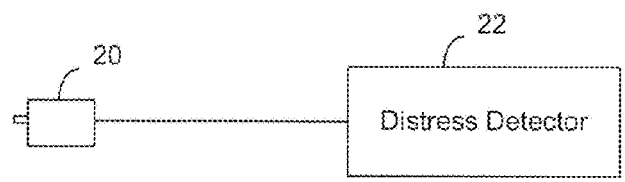
FIG. 1 illustrates an example of a vision based system for detecting a distress behavior, in accordance with an embodiment.

FIG. 1 illustrates an example of a vision based system for detecting a distress behavior, in accordance with an embodiment. The system comprises or is connected to an image sensor 20, e.g., a wide range camera, operably connected to a distress detecting device 22 (aka detector 22) for analyzing the image stream received from the camera 20 in real time or near real time for detecting a distress behavior of a human within the area that is monitored by the camera 20. The system may be configured to function in autonomy whereby, upon detecting distress the system may call a certain number for help, and/or send the images that show the distress to a third party for further analysis and/or verification and/or action.

Figure 2:
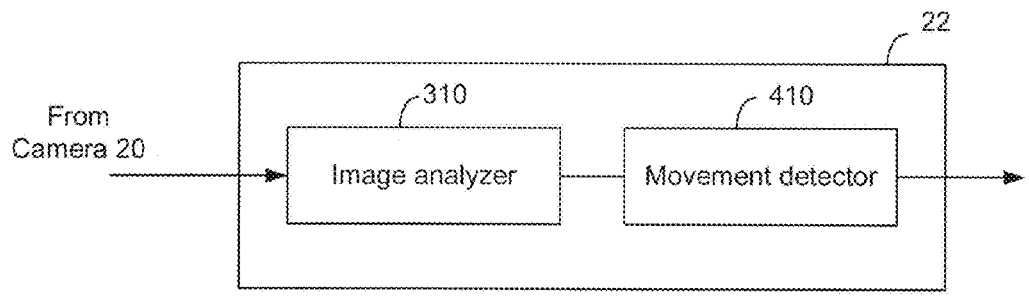
FIG. 2 is a block diagram of an exemplary distress detector in accordance with an embodiment.

FIG. 2 is a block diagram of an exemplary distress detector in accordance with an embodiment. As shown in FIG. 2, the distress detector 22 (aka system 22) comprises an image analyzer 310 for analyzing images received from the camera 20 and detecting a human body (or a body part of the human body) within the images. In an embodiment, the image analyzer outputs the position, and size of the human body within the image. In the example of FIG. 2, the image analyzer 310 is connected to a movement detector 410 for analyzing the movement of the person in the succession of images for detecting a distress behavior.

Figure 2A:
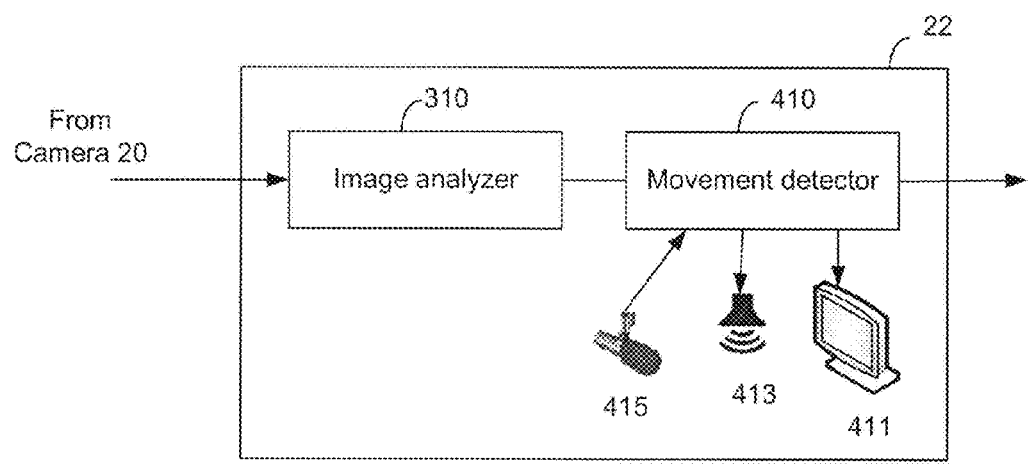
FIG. 2a is a block diagram of another example of a distress detector in accordance with an embodiment.

In an embodiment, the system 22 may be configured to monitor the movement/behavior of the detected person, and upon detecting that the person is no longer moving, e.g., the movements stop for more than a predetermined period, the system may enter an acknowledgement session in which the system may ask the person to perform a certain action if everything is fine. For example, the system may request the user to raise their hand or say something, or produce a certain rhythm/tone. The system may relay the question either in a visual manner using a certain display 411, or in an audible manner using a speaker 413. If the requested action is a gesture, the gesture may be detected in the images received from the camera 20. Alternatively, if the requested action is to say something or produce a certain rhythm/tone, the system may wait to receive the audio signal from the user using a microphone 415 operably connected to the system 22 as exemplified in FIG. 2a. The system may include a speech recognition module (not shown) for comparing the audio signal received from the microphone 415 to a pre-recorded signal using known techniques.

In an embodiment, if the requested action is performed within a pre-determined period, the system may exit the acknowledgment session. The system may mark the area in which the person has stopped moving as an area where the person chooses to voluntarily rest and/or stop moving. In the present case, even though the user responded to the system confirming that they are okay, the system may begin a drift analysis to compare successive images to detect a movement that represents presence of life such as a breathing movement in the chest area, movement of a hand, finger or the like. If no difference is detected between successive images or if the difference is very minor, the system may enter an execution session to perform a pre-determined action such as calling an emergency number for help or the like. The system may also repeat the acknowledgement session again to avoid un-necessary calls for help.

Alternatively, if the requested action is not detected within the pre-determined period, the system may proceed to the execution session to perform a predefined action, as discussed above.

In an embodiment, detection by a certain type of gestures or audio signal may cause the system to system to immediately enter in the execution session to perform the pre-defined action. For example, the system may be configured so that upon detecting a user-performed action such as raising their hand or pronouncing the word "help", the system may automatically call an ambulance or the like.

However, the preferred embodiments are aimed at detecting the distress without receiving a signal from the person because critical distress situations prohibit the user from performing gestures. For example, if the user has lost consciousness as a result of a fall or otherwise, or if the user is having a heart attack or a critical health crisis, the user cannot be expected to perform any gestures. The system 22 may be trained to detect such situations without receiving a signal from the user, as will be described in further detail herein below.

Analysis of the Area

In an embodiment, one or more image sensing devices, e.g., cameras may be placed to stream images of the monitored area. Preferably, a camera is placed in each corner of the room in order to detect images of the monitored area from different angles. The images received from the different cameras may be analyzed separately or in combination. For example, the results may be combined so that the analysis results for images of a given camera are confirmed in view of the analysis results for images produced by another camera.

In another embodiment, other types of sensors may also be used in combination with the image sensors. In a non-limiting example of implementation, a micro-phone may be used to analyze the noise associated with images in which the distress is detected/suspected. For example, if the change of position of the user from standing to laying down is associated with a loud noise the system may confirm that the person has collapsed, rather than laid down voluntarily to rest.

In an embodiment, the system may begin by analyzing the entire scene to detect a human body within the scene. Once the human body is detected, the area surrounding the human body is analyzed including when the human body is moving. The area that is of a particular interest is that in which the movement stops. As discussed above, the system may be configured so that if the user stops moving in a certain area and performs the requested action confirming that they are okay, the system will register this area and will skip the acknowledgement session next time the movement stops in the same area.

Detection of Distress

The distress conditions may take several forms including but not limited to: a sudden collapse, detection of a lack of breathing movement, delay of absence, change in speed of movements and/or threshold of activities, appearance of a second person in the room etc.

1. Collapse

In the case of collapse, the collapse movement represents a substantially vertical movement of the person. In the present case, the system may take few parameters into consideration such as but not limited to: the area over which the person collapses (e.g., whether or not the user has, in the past, voluntarily stopped moving in that area) and the speed in which the person collapsed. Other parameters may also be taken into consideration including but not limited to: the distance of the movement versus the height of the person etc.

Furthermore, the system may take the speed of the movement in consideration. For example, if the person collapses it takes less than a second, e.g., around 6-8 frames to change from a standing position to a collapsed position. However, if the person is sitting down voluntarily, the movement takes 21-25 frames to be done. The numbers provided herein depend are provided for an image sensor having 25 frames per second. However, other sensors may be used having higher or lower frame rates, and thus, the number of frames largely depends on the frame rate of the sensor/camera. This is described in further detail below with respect to the time adaptation.

2. Lack of Breathing or

The lack of body parts movement may also be a form of distress. In the present case, if the system fails to detect a life indicating movement such as breathing movement, e.g., no detection of a chest movement or otherwise, the system may enter the acknowledgement phase or may call for help immediately.

As discussed above, the system may perform a drift analysis to examine the difference between successive images to detect a life indicating movement such as a breathing movement in the chest area, or movement of the fingers, hand, head or the like. The drift processing may be performed on the pixel level to determine the difference between successive frames. An example is provided below with respect to FIGS. 3a to 3f.

In a preferred embodiment, the drift processing begins when the system detects that the person stopped moving and after the person responds to the requested action of the acknowledgement session.

Figure 3A:
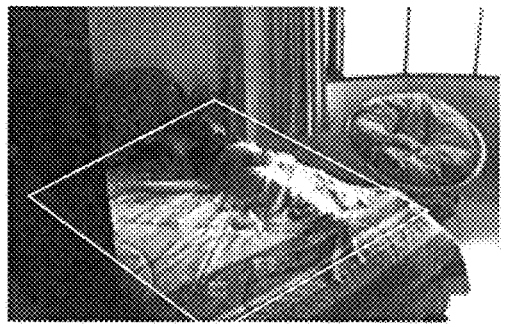
FIGS. 3a to 3f are examples of successive images used for detecting a life-indicating movement of the human body.
Figure 3B:
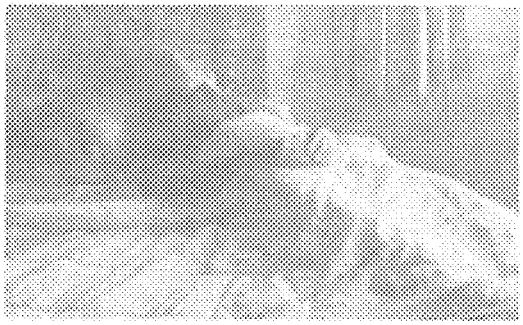
Figure 3C:
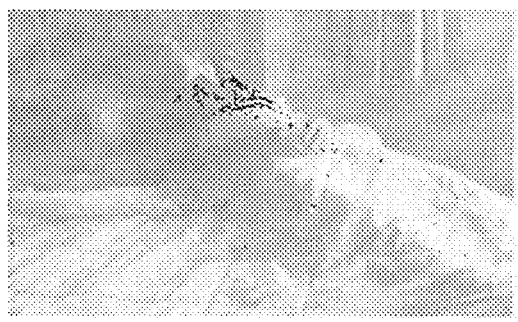
Figure 3D:
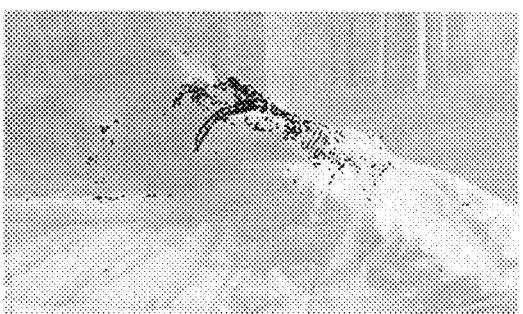
Figure 3E:
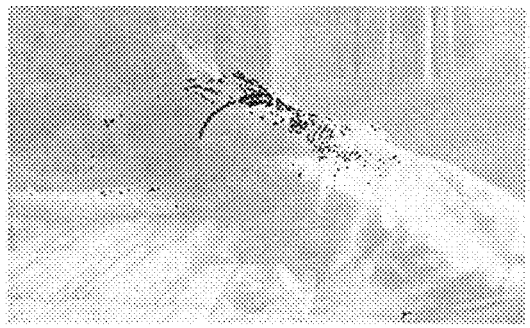
Figure 3F:

FIG. 3a is the image representing the entire scene. As shown in FIG. 3a, the image illustrates a person sleeping in bed. In an embodiment, the system may mark the bed area as an area where the user rests voluntarily. FIGS. 3b to 3f illustrate successive frames of the area in a binary format. The system may perform a comparison between a given frame (FIG. 3b) and subsequent frames on a binary level to detect whether or not the successive frames exhibit differences on the pixel level as exemplified in FIGS. 3c to 3f.

3. Time of Day and Delay of Absence

In a further embodiment, the system may take into consideration the delay of absence. In the present scenario, the system may be configured to take into consideration the time of day. For example, consider the scenario where the system is installed in an office where employees operate between 9 AM and 5 PM with a one hour lunch between 12 PM and 1 PM. In the present case, if a given period, e.g., half an hour, elapses past the last frame in which the person (employee) was detected within the business hours, the system may alert the security to investigate the matter (or perform another predefined action).

Similarly, it is possible to associate the delay of absence with the door/aperture/area through which or in which the person disappeared, whereby, it is possible to implement different periods of disappearance with different doors. In a non-limiting example of implementation, the system may be configured so that if a person disappears through a meeting room door for two hours no distress action is initiated. However, if the person disappears through a washroom door for more than one hour the system may initiate an action associated with distress.

In another example, staying in the office after hours may be interpreted as a distress condition that may be dismissed by receiving a predefined gesture by the person, or by receiving an audio signal explaining the reason for the additional stay.

4. Change in Speed of Movements

In yet a further example, the system may be configured to detect a change in the threshold of activities (aka change of pace) and/or speed of movements. For example, the system may monitor the speed of movements of a detected person to establish a range of speed. When the system detects a sudden drop or raise in the speed of movements and/or threshold of activities, the system may interpret that the person is in distress.

5. Appearance of a Second Person

In yet a further embodiment, appearance of a second person in the monitored area may be interpreted as an intrusion or distress. For example, if the system is installed in a bedroom where only one person sleeps, appearance of a second person may be interpreted as a distress/intrusion.

The following embodiments describe a non-limiting example of a system and method for detecting an object in an image. However, it should be noted that other systems and methods may also be used without departing from the scope of this document. For example: Haar Cascade, Eigenface, Eigenvector etc.

Generic Classification

The following description relates to the detection of a meta-subject within an image using a multi-dimensional classification system in which, the feature points used for the detection are extracted from the difference between an image of the meta-subject and a portion (or the entirety) of the image received from the camera 20. The embodiments are described hereinafter using a human body as the meta-subject. However, the same principles may also be used for detecting a hand or any other body part.

In the present document, a class is defined as being a collection of objects of a relevant similarity, relevant in the sense that objects of the same class would have similar classifications by the system. The embodiments describe a classification system and method which classify humans (who belong to the same class) in a similar manner, while non-humans are classified differently or not classified.

Although the methods described herein may be tailored and used for identifying a specific person from a group of people (e.g., for security purposes), it should be noted that the present embodiments are used for distinguishing humans from non-human objects for the purpose of identifying a human movement defining a breach of security. It should also be noted that the embodiments may also be applied for detecting animals and/or other objects, without departing from the scope of this disclosure. For example the embodiments may be used for detecting passage of animals through a gate or the like.

The detection process comprises a training/learning session that precedes the detection of humans from the image stream. In the training session, a set of non-human samples, e.g., images that do not include humans (aka No samples) and a set of human image samples (aka Yes samples) are fed into the system and classified in a multidimensional space, wherein the metering function used for classification has a certain monotonicity wherein objects (aka meta subjects) of same appearance are characterized by values of same/similar amplitudes. The "Yes" samples tend to cluster in the multidimensional space defining a certain volume because they show similar objects (humans) while the "No" samples disperse in the multidimensional space because they show unrelated objects, e.g., cars, houses, trees etc.

The next step would be to process the images received from the camera 20 to determine the likelihood that a human is shown in the pictures. The process involves classifying the image as a sample point in the multidimensional space including the Yes and No samples to determine whether or not the image contains a human based on the position of the sample within the multidimensional space and the number of Yes samples and No samples within the volume that surrounds the sample point.

In order to teach the human detector how a human may look like, and the difference between a human and other objects in the universe, the ideal method to detect would be to feed all images in the universe showing a human and all images in the universe not showing a human to the detector in order to inform the detector of the differences and similarities between the submitted sample and the rest of world not including a human. If that was possible we would be sure and certain to find the image of any human of any individual in such database. In such database the radius of exploration to find the sample is zero because the sample is there. The method would be of a deterministic nature. However, in reality, there is no method of direct access to this hypothetical infinite bank space and the decision need to be taken using a far more limited subset to get a discrete and decent count of data for the bank. The amount of samples also needs to be compatible with the processing power available for the apparatus.

This involves a limited set of images used as references. This limited set of images represents one draw from an infinite set of images from the universe. Accordingly, the method of detecting an image is of a probabilistic nature (rather than a deterministic nature).

In this case, there is a need for radius of exploration of a certain size around the sample in order to have a chance of finding the submitted human using samples from the draw. The challenge is then to find a good enough metering method to convert the bank of reference images to a database of values, and have a sufficient amount of samples in the database such that the volume defined by the radius may include a sufficient amount of samples for discrimination.

In this bank of sampled images based on the sampling method, a good metering method will create an attractor for the subject to recognize, around which all the images of similar aspect will group allowing an easier determination of the class that the object belongs to. For example, a naive metering method going from pixels to a single value may include a blunt subtraction of a submitted image containing a human to a reference image of a human, then summing all normed differences, to deliver a single outcome, this can be expected to show a smaller value when applied to images containing another human than to an image containing a car or tree or a non-human object.

This crude approach requires a very large number of "Yes" and "No" samples in the database in order to output a reasonably educated guess, because the volume or search around a specific candidate point is small and the search requires a certain number of samples within the volume. In other words, the density of Yes samples around a specific candidate sample needs to be very high because the radius of exploration around the specific sample needs to be very small to avoid errors.

Accordingly, when dealing with real samples available for learning, it is needed to increase the number of values revealing a shape to detect and find a comparison method that is intrinsically more adapted to a small variation of aspect. In the preferred embodiment a set of 21 values have been chosen for embodiments using 2D images and 73 values for embodiments using video clips, e.g., 2D+Time, and to increase the pertinence of each set, and improve the monotonicity of the transformation from a N-tuple of data (images) to a P-tuple of features for classification, a best fit process has been adapted to select the best values amongst many comparisons.

The embodiments aim first at establishing the best possible transformation from the real image space (reality) to the smallest possible number of values, where the transformation is expected to keep most or at least sufficient amount of the characteristics of the original image to allow discrimination of the subject versus all other images. The discrimination process then uses a reference set including a subset of the limited bank of images. Then the classification within this space of small number of values becomes easier, aiming at delivering a revealing single final outcome that the submitted Image contains a human. As this bank is just one 'draw' of the infinite reality, any evaluation of similarity to this limited subset is of a probability nature. It involves an unknown and incomputable probability that the draw represent the reality.

But if the draw is representative enough and the transformation is carrying enough of the characteristics of the object to classify, then the results of the transformation of a sampled image can be consistently compared to the draw set or between them or to a model, delivering a probability like outcome. Therefore if the subset is well chosen, the probability that the draw is representative of the humans in the world would be very high and the outcome of the detector will carry on this high probability. Even if the relevancy of the draw to universe cannot be known, the more "Yes" samples (image that belong to the class) and the more "No" samples (images without member of the class) are used, the more the bank will converge to this hypothetical value. In other words, as a general rule the more known samples we have in the database the more accurate the results would be (known in the sense that the samples are known as being YES or NO).

This model allows for measuring the consistency of the chosen bank of images in the lab as test and feedback allow for a trial/error experiments to see when convergence reaches an acceptable level when testing a probe set of humans. The learning bank may still benefit from an increase in samples, either satisfactorily if using a specific image like an exact human of the user, or the user's living room or office as backgrounds.

In an embodiment, the learning bank of samples is built using the comparison values between a plurality of images and an ideal image or a plurality of ideal images of the subject (in this case a human body). In the present case, each comparison produces a different set of 21 values. For example, each one of the images in FIG. 7 will produce a different set when compared to each one of the ideal images 345-1 to 345-7 of FIG. 6.

In an embodiment, the database may be split in sections, each section may be associated with an ideal image of the meta-subject (human body), e.g., images 345-1 to 345-7. In another embodiment, the database may contain all the coordinates in a single folder with an index of which coordinates correspond to which ideal image. This allows for more elaborated use of the database so that for example when considering one comparison to one meta-subject, a selection of the other can be considered as "No" samples. This allows for a better use of the image set information, and also allows for organizing the similarity by proximity of aspects and for using this proximity. For example while searching for Meta-subject 345-6, meta-subjects 345-5 and 345-7 exhibit higher values than the rest of the images in FIG. 6. Such values may be used as a confirmation and may also be used in an aggregation process to increase the pertinence of the very final outcome. This is only one example of how the computed data relative to multiple meta-subjects may be used. For sake of clarity the embodiments below will be explained with respect to a single meta-subject.

In an embodiment, the ratio of similarity between a submitted sample and the meta-subject (human body) is computed by counting all the Yes samples and the No samples in the vicinity of the submitted sample in the database. Subsequently, this ratio is divided by the same ratio of samples but using all samples from the database in order to produce the ratio of final similarity.

This transformation is expected to be consistent enough (reproducible) and the art is then restricted to the handling of a set of N-tuple sampling values (set of pixels of an Image). The associated bank of discrete values will be hereinafter referred to as database. In the following discussion, the size of the digitized subset is said to be of an N dimension where N is for example=640*480 pixels.

On a sample set of a defined dimension N, (a N-tuple) then transformed to a system of values (a coordinates system) of P values (a P-tuple), the confidence of similarity is correlated to the density of similar samples within the vicinity of the sample submitted once transformed from a N-tuple to a P-tuple. Accordingly, in the database of a coordinate system of P dimension using a transformation, the best similarity result should aggregate around a volume of choice, also called vicinity of the sample. The size of the vicinity is a trade-off between being too small then missing a human in an image and being too big then allowing artifact to be detected as humans. The way this size is chosen is explained below.

The restriction of definition of the detection as generalized above can be summarized mathematically as to find a transformation from $\mathbb{R}^{N.N} \rightarrow \mathbb{R}^{N.P}$ where N is typically the dimension of images in pixels, and P being another space typically of smaller dimension where the handling of the N-tuple data set from $\mathbb{R}^{N.N}$ is expected to be far easier than in $\mathbb{R}^{N.N}$ itself.

This is the essence of classification in the art of Image detection. The challenge is then is to find an appropriate transform $f_k \mathbb{R}^{N.N} \rightarrow \mathbb{R}^{N.P}$ that keeps as much as possible of the features of interest of the N-tuple from $\mathbb{R}^{N.N}$ (the Images data set of pixels) to a P-tuple from $\mathbb{R}^{N.P}$ for easier handling.

Accordingly, the embodiments attempt to find a reduction function $f_k$ which allows reducing the number of dimensions from N to P, where P is not more than a couple of dozens (in a non-limiting example of implementation). The subjective (one or more origin for the same destination) capability of $f_k$ allows for feeding the detector with images of various dimensions without decimating information as it could happen for example if normalized with a zoom to a standardized dimension required by some other image detector. Otherwise said the function $f_k$ may be such that different N values can inject in a single value P to allow comparison of N-tuple of different N dimensions to the same database of P dimensions. It is of interest to consider a small enough P and a function that allow the P values to be used as a coordinates system so that the database of learned samples can be seen as a multidimensional space (P) and the probed sample will be at specific coordinates surrounded by learned known samples so that they can easily be enumerated.

For example, on an image of 1000×1000 pixels, the N-tuple can vary between 30×30 if the subject is very small to 1000×1000 if the subject covers the whole image. So for an N can be 1000×1000 or 640×480 or even 30×30 it is interesting to find a reduction function $f_k$ to a space of dimension P where P is not more than a couple of dozens. In a preferred embodiment, P is in the range 21 (for 2D images) and 73 (for video clips: 2D images+Time).

The injections capability of $f_k$ allows for feeding the detector with images of various dimensions without decimating information as it could happen during a zoom to normalize dimension. One of the benefits of this approach is to avoid establishing a sum function early in the detection process. Other benefits include: allowing all samples to be considered without precluding a level of interest, and to allow progressive transformation of aspect of the subject as in a video sequence but still accounting a progressive shift of the aggregate in the P space. This also allows using many transformations $f_k$, and also allows for dynamically adapting the different transformations.

Embodiment Using 2D Images

The first embodiment uses a 2D image set. Tracking may be done as a post processing once confidence, size, and position, are reported to a kinematics/movement analyzer. In the present embodiment, it is possible to use the following $f_k$ function to go from $\mathbb{R}^{N.N} \rightarrow \mathbb{R}^{N.P}$. It must be noted that the apparatus operates on a subset of $\mathbb{R}^{N.N}$ because the images are coded with pixels with 8 or 16 bits of significance, so that sub-image of N pixels are member of $\mathbb{N}^{N.N}$.

In an embodiment, the chosen function $f_k$ may be expressed using the following function:

$$f_k = f_{SSD} \circ f_{conv} \circ f_{tile}$$

where $f_{tile}$, $f_{conv}$ and $f_{SSD}$ are as follows:

1) $F_{tile}$ $F_{tile}$ is the transformation function from $\mathbb{N}^{N.N} \rightarrow \mathbb{N}^{N.P \times M}$. P being the goal number, here taken from the value computed for a number of tiles (21) as explained below. M being an arbitrary number that depends upon the submitted images, e.g., M may be the number that allows accounting for the number of pixels that is necessary to make one of the P tiles. In an embodiment, P*M>=N.

Practically $f_{tile}$ is a pyramidal decomposition of the image in a fixed number of tiles. The dimension of the tiles may be variable and some padding may be necessary. This transformation creates a fix number of tiles, of various levels, independently of the dimension of the image so that images of heterogeneous dimensions (different N for the N-tuple) can be used leading to a compatible P-tuple. This pyramidal decomposition had been chosen to generate 4×4+2×2+1 tiles on the Meta-Subject which then allow consideration to be given for each tile to generate the P-tuple, then with P=21, one dimension for each tiles.

2) $F_{conv}$ $F_{conv}$ is the transformation function from $\mathbb{N}^{N.P \times M} \rightarrow [0, 1]^{P \times M}$. For each level or the pyramid, an initial neutralization of the image luminance is effected through a convolution hereafter called gradient. It is possible to use a simplified method made of the average of Luminance−Luminance. $F_{conv}$ being expressed in the following equation:

$$C_{x,y} = \sum_{I=-n, J=-n}^{n,n} L_{x+i, y+j} - L_{x,y}$$

$C_{x,y}$ being the value at position X,Y. N being equal to 5% of the image size. $L_{x,y}$ being the Luminance at position X,Y.

The average luminance may be locally determined within a certain radius for each pixel (1-5% images size range), then, the original Luminance signal is subtracted from this average. This method accounts for variation of lighting condition. This composed continuous gradient is finally threshold to generate a binary mask and used as data for the search phase.

3) $F_{SSD}$ $F_{SSD}$ is the transformation function from $[0, 1]^{P \times M} \rightarrow \mathbb{R}^{N.P}$. The P-tuple value is determined for each tile from a measure of a matching, each value is computed as the smallest Sum of Square Difference (SSD) between the Subject Model (the Meta-Subject), and the candidate sample. While the Meta-Subject is searched in the sample, many morphed versions of the Meta-Subject are prospected. This morphing may include a composition of anamorphic zoom and slight rotation (10 or 20 degrees typically). This is done in order to maximize the difference between a potential candidate and any artifact. Thus, minimizing the difference between the Meta-Subject and a potential candidate.

In an embodiment, this process is done individually for each tile cut out of the pyramidal decomposition, but some coherency is mandatory (maximal overlap, minimal coincidence of lower level with higher level). It must be noted that top level of the pyramid contains the Meta-Subject entirely.

It should be noted that the $f_k$ function is an implementation decision intended to ease the computation. Other embodiments are also possible including but not limited to: wavelet transformation followed by intensity selection.

Embodiment Using Video Clips (2D+T)

In a variation of the embodiment using 2D images, the system may also use video clips, thus, adding the time as an additional parameter to the samples used for training. In the present embodiment, the YES and NO samples recoded in the database are video clips representing scenarios of distress and non-distress scenarios, respectively. An example, of a distress scenario may include a video clip of a person falling. By contrast, a non-distress scenario may include a video clip of a person laying down on bed or sitting on a chair, or bending down to pick up something from the floor etc.

In the present embodiment, the pyramidal decomposition may have a different progression rate on the time axis. Additionally, the $f_k$ function may be considered as a dimensional extension of that used in the 2D model discussed above but applied to a 3D dataset. FIG. 8c is a three dimensional view of a video clip sample illustrated in the form of a voxel. The N-tuple sample is then made of the images data over a certain number of frames. Typically 4 frames but in some case it can be the whole sequence. In an embodiment, the chosen function $f_k$ may be expressed using the following function:

$$fk = f_{SSD} \circ f_{conv} \circ f_{tile}$$

where $f_{tile}$ $f_{conv}$ and $f_{SSD}$ are as follows:
1) $F_{tile}$ $F_{tile}$ is the transformation function from $\mathbb{N}^N$·$^N \to \mathbb{N}^N$·$^{P \times M}$. P being the number of tiles. M being the number of pixels in a given tile.

Practically $f_{tile}$ is a pyramidal decomposition of the image in 3D blocks. The Time axis may have a fixed size (in number of frames) while other axes are dependent on the submitted sub-image size. This transformation may create a certain number of blocs at various levels, independently of the dimension of the images. Whereby, images of heterogeneous dimensions (different N for the N-Tuple) can be used, thus, leading to a compatible P-tuple.

The result is a P-tuple where for 4 frames, P=4×4×4+2× 2×2+1=73. Accordingly, there exist 73 best match coordinates from the tiles of the pyramidal decomposition.

2) $F_{conv}$ $F_{conv}$ is the transformation function from $\mathbb{N}^N$·$^{P \times M} \to [0, 1]^{P \times M}$. The convolution process is the same as in the 2D embodiment, but applied on 3D data. $F_{conv}$ may be expressed using the following equation:

$$C_{x,y,z} = \sum_{l=-n, J=-n, k=-2}^{n,n,2} L_{x+i,y+j,z+k} - L_{x,y,z}$$

$C_{x,y,z}$ being the value at position x,y,z. N being equal to 5% of the image size. $L_{x,y,z}$ representing the Luminance at position x,y,z.

3) $F_{SSD}$ $F_{SSD}$ is the transformation function from $[0, 1]^{P \times M} \to \mathbb{R}^{N \, P}$. The metric for obtaining the values of the P-tuple is exactly of the same nature as above, and may be done using a SSD that is applied to a Meta-Subject of the same dimension.

It should be noted that the choice of 73 coordinates is an implementation decision that is intended to ease the computation load required. Other methods may also be possible depending upon the speed of the movement and the noise of the surrounding environment. Needless to say, the higher the speed, the more frames are needed to match that speed. Subsequently, the higher the take-up the more frames can be used.

Time Adaptation

In an embodiment, time adaptation may be needed between samples in the database and the candidate samples received and/or analyzed in the system. Time adaptation may also be used during the learning phase when receiving images from sensors having different frame rates. However, if the movement in the candidate sample is done within the same time frame as in the database samples, and if the frame rate between the database samples and the candidate sample, then the matching process does not need an adaptation of time frame.

Accordingly, when operating in the 2D+T mode, the system may perform an additional processing representing sample re-construction, such as the addition or removal of frames from the sample (aka compression or expansion of samples) to match the samples stored in the database so that the matching process of the Meta-Subject and the database of learned sample are all homogeneous and in sync.

Detection of Meta-Subject in an Image

Figure 4:
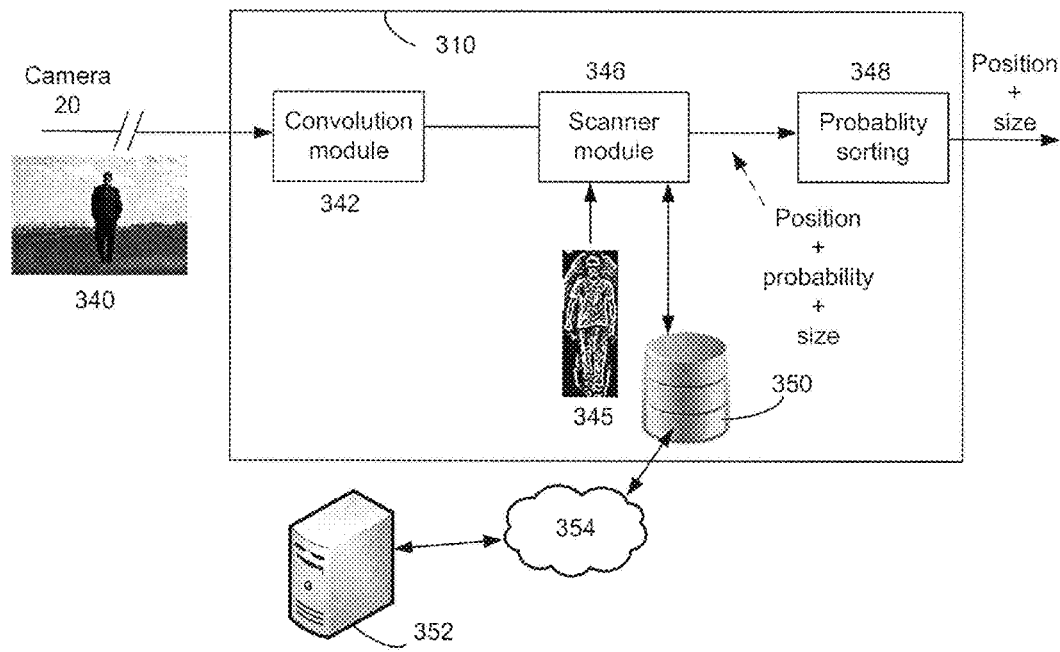
FIG. 4 illustrates an embodiment of the image analyzer used for detecting the object (human) in an image and delivering the position and size of the object in the image.

FIG. 4 illustrates an embodiment of the image analyzer 310 used for detecting the object (human) in an image and delivering the position and size of the object in the image.

As shown in FIG. 4, the image analyzer 310 receives a stream of images 340 from the camera 20. In an embodiment, the image analyzer 310 comprises a convolution module 342 adapted to process the images 340 received from the camera 20 to enhance peculiarities of the image such as edges and for making the image in a binary form allowing fast comparison between the images 340 and an ideal image 345 stored in memory which has also been processed in the same manner. The binary version 344 of the image 340 is sent to a scanner module 346 for search and evaluation.

The scanner module 346 receives as inputs a convoluted version (binary version) of an ideal image 345 of a human (which is preliminary processed using the process 342), and a convoluted version 344 of the image 340 received from the camera 20 and outputs the highest probability of the presence of a human in the image 344, the size and the position of the human in the image 344. In other words, the scanner module 346 outputs: 1) the highest probability that a human is found in the image 344, 2) where the human was found, and 3) the size of the human within the image. In an embodiment, the scanner module may have access to a local database 350 and/or a remote database/server 352 via a telecommunications network 354 for obtaining the sample images and/or their corresponding SSD values used for computation as will be described hereinbelow.

In an embodiment, the scanner module 346 is connected to a probability sorting module 348 which is adapted to eliminate probabilities that are below a predefined threshold.

Accordingly, the image analyzer outputs the size and position of the human within the images received from the camera 20.

Figure 5:
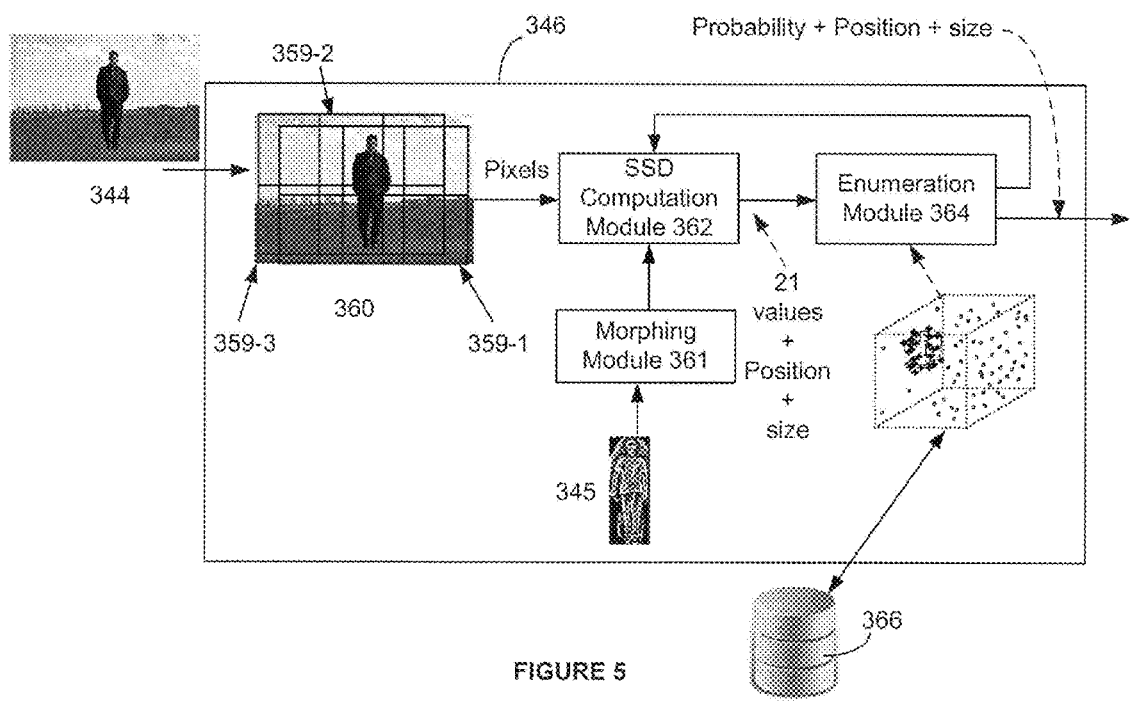
FIG. 5 illustrates a non limiting example of a block diagram of a scanner module in accordance with an embodiment.

FIG. 5 illustrates a non limiting example of a block diagram of a scanner module in accordance with an embodiment. As shown in FIG. 5, the scanner module 348 receives the binary image 344 and subdivides it into a plurality of areas 359 (e.g., rectangles) of various sizes as shown at 360. The size of the rectangle depends on the size of the image of ideal human 345 once morphed. Each one of the areas is scanned in order to evaluate the probability of the presence of the object (human) in it.

In an embodiment, the search is done using steps of four pixels repeated over the entire candidate image (the embodiments are not limited to four pixels, and may be implemented with different numbers of pixels depending on the size of the area 359 and the resolution of the image). In other words, the area of search is moved by four pixels at each iteration. Whereby adjacent areas 359 may have overlapping pixels. The intent of this method is to find the best match that leads to the lowest Sum or Square Difference (SSD) values.

Figure 5A:
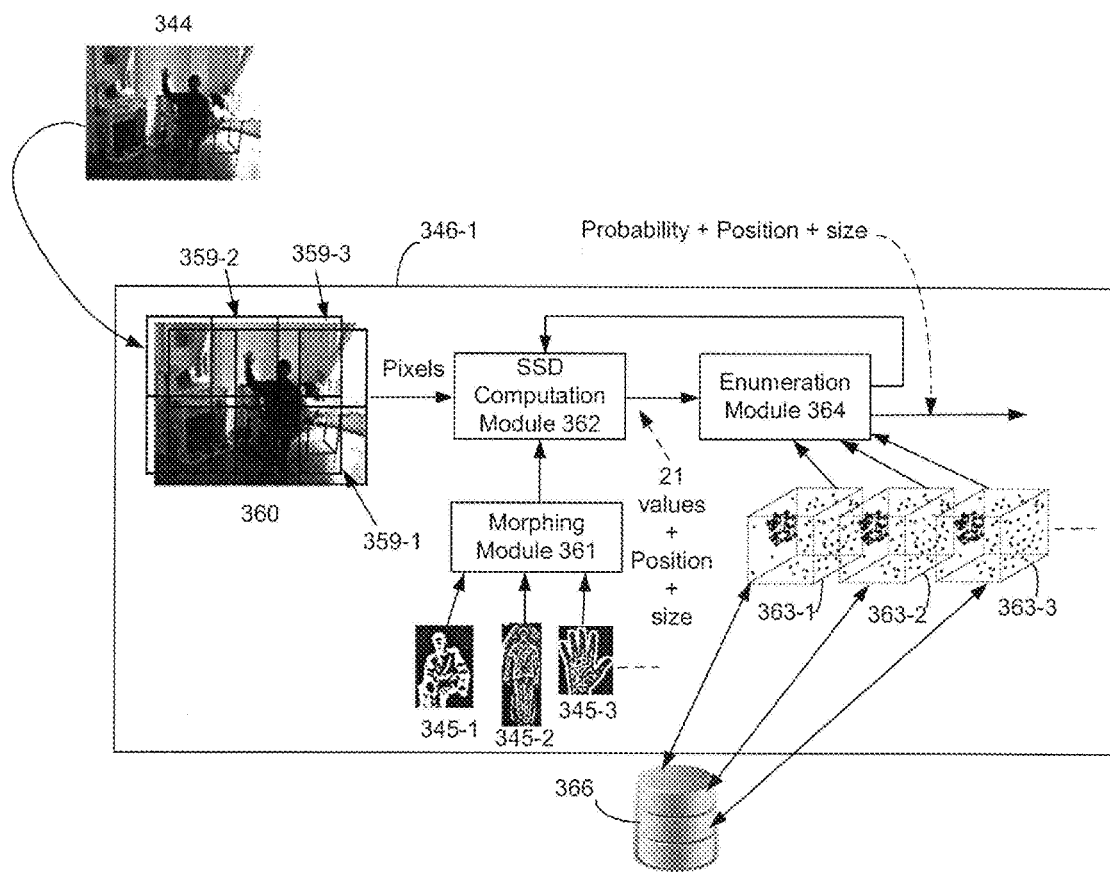
FIG. 5a illustrates another example of a scanner module for detecting multiple meta-subjects, in accordance with an embodiment.

For example, if the image size is as follows: 1024 pixels*1024 pixels, the resolution may be lowered by a factor of four thus obtaining an image of 256 pixels*256 pixels. With a stepping rate of 4 pixels this leads to a (256/4)*(256/4)=4096 areas of interest (rectangles). Pixels of each area of the 4096 rectangles are fed to an SSD computation module 362 which is adapted to evaluate the difference between each rectangle and many morphed (distorted) versions of the ideal image of the human 345 produced using a morphing module 361. The morphed versions of the meta-subject may also include images of the meta-subject in different positions. Alternatively, the different positions may be searched for as different meta-subjects as illustrated in FIG. 5a.

The number of distorted versions used in each cycle may be in the range of 1000 representing various positions, scaling and rotations of the human 345 in order to maximize the chance of finding a decent match in the image 340, otherwise said in order to get a better representative SSD (of a low value then) many attempts are made to see if an adapted version of the tile doesn't exhibit naturally a certain level of similarity. For example, the morphing module may apply one or more combinations of: + to −10 degrees rotations by increments of 2 degrees for each rotation, 20 scaling levels, five x-y distortions for each scaling level etc.

Figure 6:
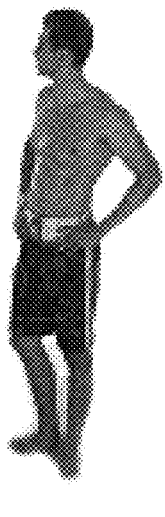
FIG. 6 illustrates images of humans in different positions for use as YES samples.
Figure 6:
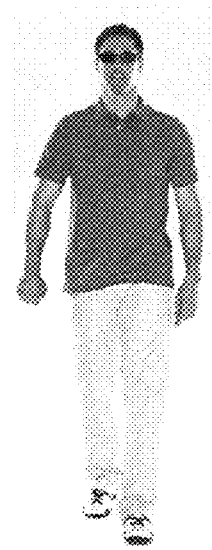
Figure 6:
Figure 6:
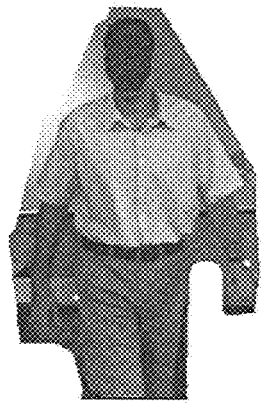
Figure 6:
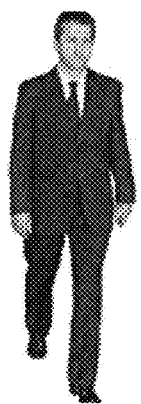
Figure 6:
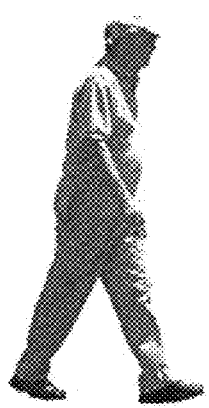
Figure 6:
Figure 7:
FIG. 7 illustrates examples of images that do not show a human, for use as No samples.
Figure 7:
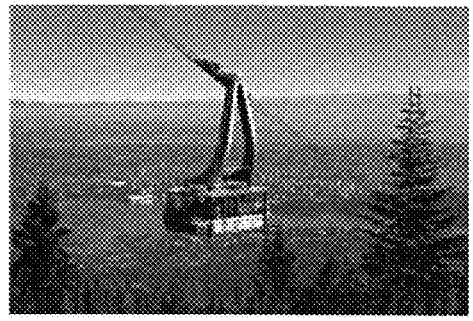
Figure 7:
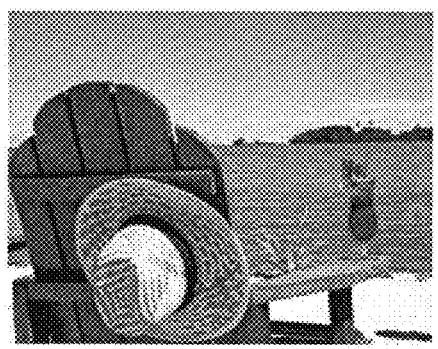
Figure 7:
Figure 7:
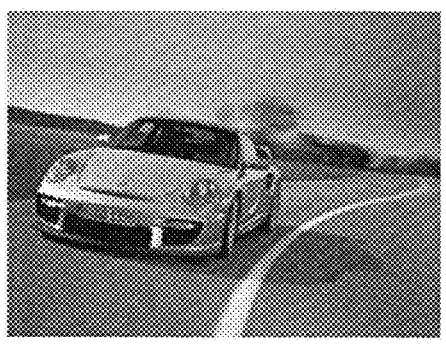
Figure 7:
Figure 7:
Figure 7:
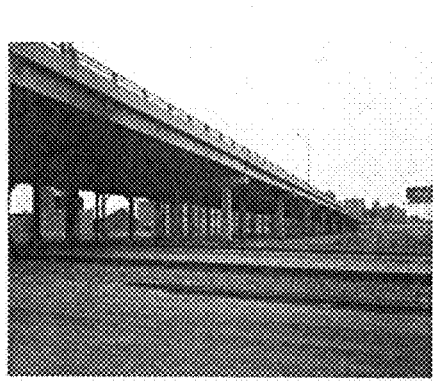

In an embodiment, a plurality of ideal images 345, each defining a different posture, may be provided to the scanner module 346 to compare the image 344 to each of the images 345 for a better detection of a human body. FIG. 6 illustrates a non-limiting example of different postures that may be used as the image 345.

Referring back to the SSD computation module 362, this module performs the sum of the square of the difference between pixels of each of the morphed versions 345 and each rectangle 359 in the binary image 360 to determine the likelihood that a human exists in the rectangle 359. The SSD module 362 is adapted to find the best match from all the morphed versions tried on each rectangle 359. The result of the best match search between each candidate image 344 and the morphed versions of the ideal image(s) 345, is the lowest SSD values found for each candidate image 344. Needless to say, the SSD values are the lowest when the image 344 contains an object that is similar to the object shown in the image 345. This best match search must only be seen as an implementation decision allowing to decrease the probability evaluation step of "yes"/"no" volume, which otherwise can be done for every morphed version of the meta-subject but this would increase the computational load without major improvement over the results provided by the best match principle which requires much less computations. In other words, the best match approach provides for improved results with less computational efforts on the computing device.

In an embodiment, the comparison process for each image 360 is divided into 21 comparisons performed in pyramidal manner as will be described herein below. It should be noted that the number 21 in this context is only an implementation decision. However, the embodiments are not limited to such constraint. In an embodiment, the SSD computation module 362 performs the comparison in a loop whereby each rectangle 359 is compared to each morphed version of the image 345, in order to choose the lowest 21 SSD values. It should be understood that the 21 values are considered as a set. This process is repeated to find the lowest 21 values for each rectangle 359. The number of comparisons made for each image may reach approximately 4 millions.

In an embodiment, the parameters used to morph the image 345 which lead the lowest 21 values are kept for use in determining the final computation, position, and size of the human.

Referring back to the SSD computation module 362, this module 362 outputs the 21 best match values (lowest values) for each rectangle 359 in the image 360. In the present example, selection of the number of values is described herein below.

The SSD computation module 362 outputs the 21 values but carry also the position and size of the human within the image. The enumeration module 364 weights the 21 values and delivers a probability that the 21 values represent a human based upon the reference samples provided in the database 366. The database 366 may be a local database and may also be fed/updated by a remote server over a telecommunications network.

It should be noted that the database 366 may and may not be the same as database 350 of FIG. 4. In a preferred embodiment, database 350 includes the sample images used in the learning phase, while database 366 includes the content of the multi-dimensional space, e.g., the corresponding SSD values of the images of database 350.

Inside the enumeration module, the 21 values of a given image are used as coordinates of a sample point representing the given image in a 21 dimensional space. The 21 dimensional space contains the 21 values (coordinates) preloaded in the database 366 for the Yes and No samples. Each set of 21 values represents the output of SSD computation module 362 applied on images received from an image bank (not shown). The bank of images stores images that include humans and only humans (as exemplified in FIG. 6), and images that do not contain humans (as exemplified in FIG. 7). The set of 21 values associated with images that include only humans are considered as YES samples (or match samples) in the multidimensional space, while the 21 values associated with images that do not contain humans are considered as "No" Samples.

By essence, when images that include a human are compared to the ideal image of the human 345, the set of 21 values which are the outcome of the SSD computation module 362 for these images will be low and probably similar. By contrast, when images not including humans are compared to the image of the ideal human 345, the set of 21 values which are the outcome of the SSD computation module 362 will be high and not similar at least for a few of them (along few of the dimensions). This should be understood as a search/comparison of each individual image of the meta-subject. This operation must be repeated for each image of the meta-subject that had been chosen as pertinent for the implementation, e.g., images 345-1 to 345-6. In an embodiment, it is possible to apply an implementation method to speed up the multiple analysis of multiple images of the meta-subject. As a crude example of this implementation, the similar part of each tile of meta-subjects can be pre-analysed so that a match will be considered as relevant for the entire category.

The 21 values represent the coordinates of points in the 21 dimensional space. Accordingly, the sets of 21 values associated with images that have humans include coordinates that will cluster in the 21 dimensional space and should exhibit a rather monotonic comportment simultaneously in all dimensions. By contrast, the sets of 21 values associated with images that do not have humans may have good score of matching in one dimension but can simultaneously express a bad result in another dimension, hence tend to disperse even if sometime close to the edge of the hypercube. An example is provided below with respect to FIGS. 8a and 8b.

Figure 8A:
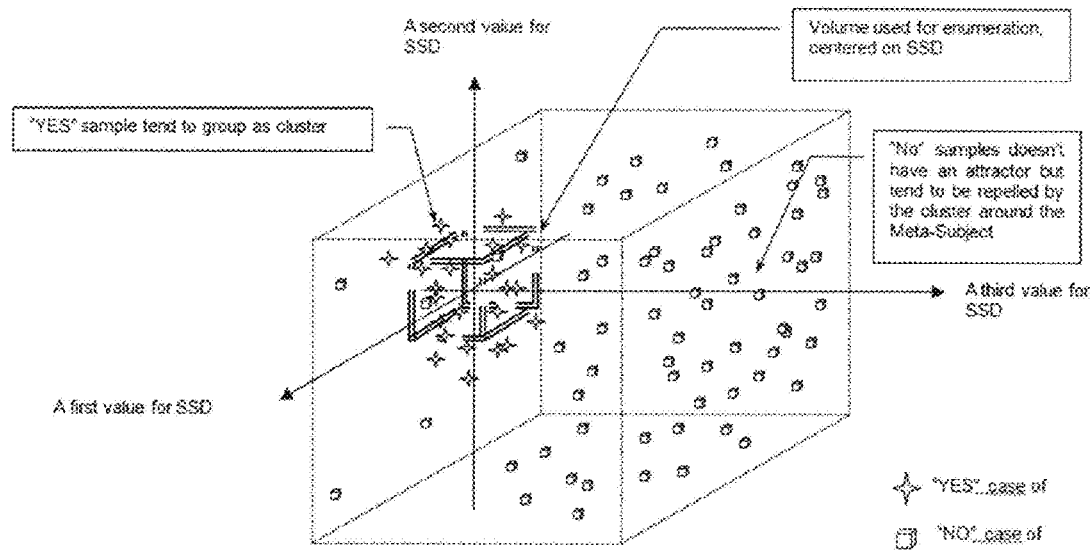
FIG. 8a illustrates an exemplary three dimensional space including a plurality of reference samples of images representing humans which are considered as the "Yes" samples, and images not containing humans which are considered as the "No" samples.

FIG. 8a illustrates an exemplary three dimensional space including a plurality of reference samples of images representing humans which are considered as the "Yes" samples, and images not containing humans which are considered as the "No" samples. As shown in FIG. 8a, the Yes samples form a cluster while the No samples disperse in the space. It should be noted that FIG. 8a is only a hypothetical example in three dimensions which is only intended for illustration purposes while the real embodiment is implemented using 21 dimensions (which cannot be illustrated to humans, but can be implemented in machines because an additional dimension for a machine means simply an additional index).

Figure 8B:
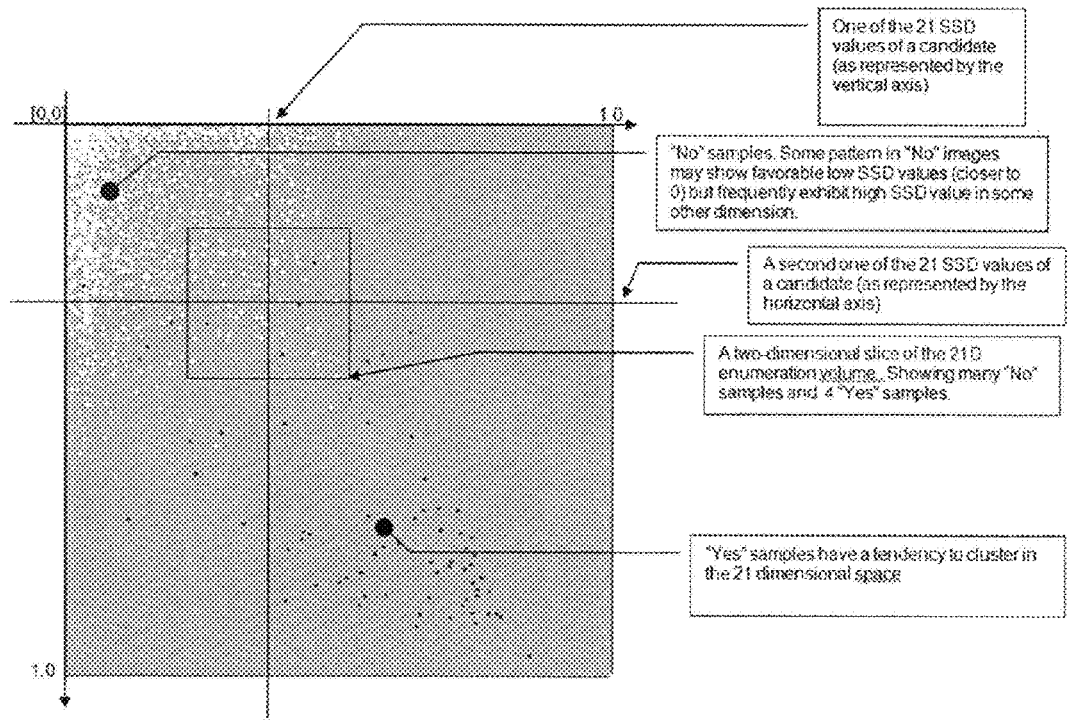
FIG. 8b illustrates a two-dimensional illustration of the 21 dimensional space representing a slice along two dimensions.
Figure 8C:
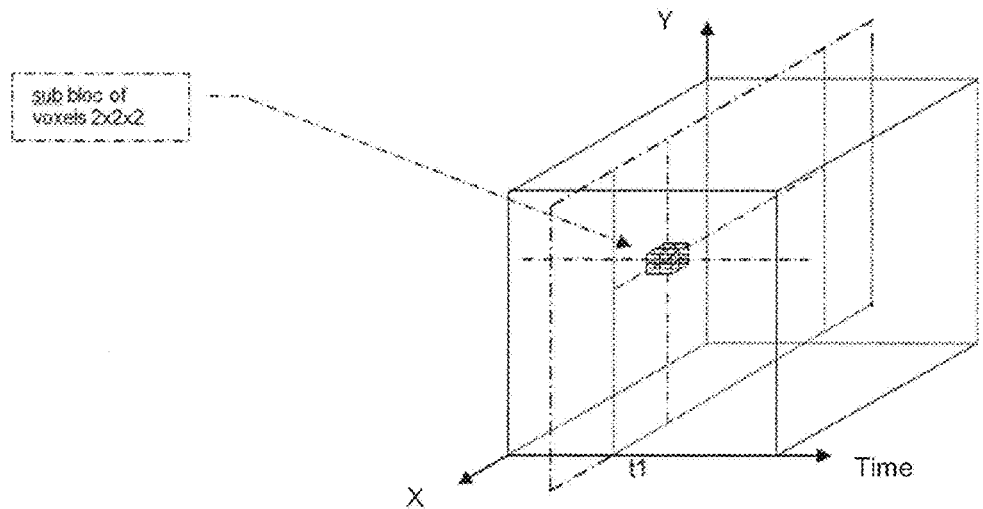
FIG. 8c is a three dimensional view of a video clip sample illustrated in the form of a voxel.

FIG. 8b illustrates a two-dimensional illustration of the 21 dimensional space representing a slice along two dimensions. In FIG. 8b, the white dots represent coordinates associates with No samples, while the black dots represent coordinates of Yes samples. As illustrated in FIG. 8b, the white dots tend to define high and low random values within the space, and this is due to the high differences they have with the ideal image of a human.

In an embodiment, the enumeration module 364 applies for each rectangle 359 the 21 values output by the SSD computation module 362 in order to determine a probability that the rectangle being examined shows a human. In one embodiment, the enumeration module counts the YES and NO samples around that point within a volume of a reasonable size, and divides the number of Yes samples by the number of No samples to obtain a ratio of YES versus No samples within the volume. This ratio is then divided by the ratio of Yes samples versus No samples in the entire database (space). The resulting number represents the probability that the rectangle in question contains a human. Accordingly, the more samples there is in the database the more accurate the results will be. In an embodiment, a surface interpolation method may be used to synthesise "yes and "no" samples in an area of the space having a poor density of samples in order to avoid computational error or wrong rounding.

The size of the reasonable volume around a certain sample may be defined in a variety of methods. In one method, the size is related to the density of the database such that the volume must contain a certain percentage of the entire count of samples in the database. In another embodiment, the size of the reasonable size may be related to size of the smallest volume that may be found in the space which includes a specific set of samples representing humans. In another embodiment, the size may be dynamically sized (variable) along one of more of the dimensions until one of the above criteria is met. Other methods may also be used without departing from the scope of the embodiments.

Referring back to the enumeration module 364, this module performs the processing in a loop on all the areas 359 (as they shift by four pixels as described above), until the entire image is scanned.

Pyramidal Comparison

As discussed above, the SSD module 362 performs a sum of square difference of pixels between each of the morphed versions 345 of the ideal human and each rectangle 359 in the binary image 360. In a non-limiting example of implementation, the comparison process for each image 360 comprises 21 comparisons performed in pyramidal manner, whereby different morphed versions of the ideal human are compared to each rectangle 359.

Figure 9:
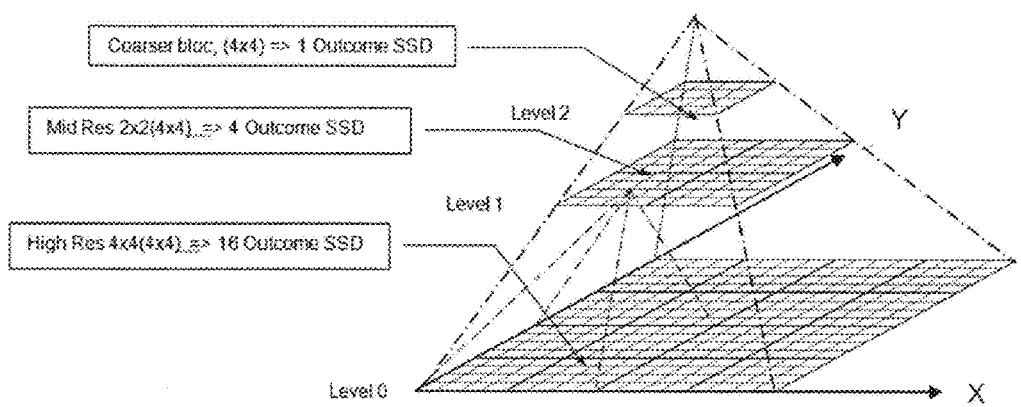
FIG. 9 illustrates a pyramid including three resolution levels for the ideal image of the human.

FIG. 9 illustrates a pyramid including three resolution levels for the image 345 of the ideal human. A level 0 which has the highest resolution and includes 16 tiles, a level 1 which has a medium resolution and includes four tiles, and a level 2 level which has the lowest resolution and includes a single tile. In an embodiment, the scan begins with the level 2 image (image of the entire human in a single tile) to perform one comparison, then proceeds to the level 1 to perform 4 comparisons, e.g., comparing each of the four tiles of the image to the rectangle 359 in question, then proceeds to the level 0 image to perform 16 comparisons, thus resulting in 21 comparisons. The 21 comparisons provide a set of 21 values associated with each rectangle 359. The 21 values are the coordinates of the sample point representing the rectangle in a 21 dimensional space.

The progressive comparison from coarse resolution (level 2) to finest resolution (level 0) allows increasing speed and efficiency giving the opportunities of using guidelines for the search of lower tiles. For example, the centre of tile of a lower level is constrained to stay within the proper quadrant of their respective tiles of higher level.

In a preferred embodiment, a comparison is performed between each distorted tiles of the pyramid and the original image. This allows for decreasing computation at analysis time, and also allows for a certain degree of freedom for each tile allowing them to exhibit their own best match within each scan part of the loop process in order to choose the lowest 21 SSD values.

It should be noted that the search for the best match itself before submission to the enumeration module is an implementation decision that can be removed entirely, whereby the 21 values outcome from every set of morphed version tried on every area of interest (359) (in the range of millions) can be submitted to the enumeration volume to deliver a probability with good quality that the human exists.

Searching for Multiple Meta-Subjects Simultaneously

For simplicity purposes, the embodiments discussed above with respect to FIGS. 4 to 9 describe the detection of a single meta-subject (human body) in a candidate image. However, the embodiments may also be used to detect more than one meta-subject at the same time using the same principles.

As discussed above, the system may ask the detected user (who is suspected to be in distress) to raise their hand or perform a certain gesture so that the system may exit the acknowledgement session or confirm the case of distress and enter the execution sessions. Furthermore, the system may also be configured so that, if the detected user is in distress and the system did not detect the distress behavior, the user may trigger the execution session by performing a certain gesture. Accordingly, the system may be configured to simultaneously search for multiple meta-subjects, in accordance with an embodiment.

FIG. 5a illustrates a non limiting example of a block diagram of the scanner module of FIG. 5, in accordance with another embodiment. As shown in FIG. 5a, a convoluted image 344 is received at the scanner module 346-1 to be scanned in search of multiple meta-subjects 345-1 to 345-n. In a non-limiting example of implementation, the meta-subjects may include different positions of a human body, e.g., 345-1 and 345-2, and body parts such as a hand 345-3 etc. In an embodiment, each different meta-subject requires a different multi-dimensional space. The database 366 may include SSD values corresponding to multiple multi-dimensional spaces 363-1 to 363-3 corresponding to different meta-subjects, e.g., hand 345-3 and human body 345-1 or 345-2, or different positions of the same meta-subject, e.g., human body in standing position 345-1, human body in sitting position 345-2 etc. Needless to say, the SSD values corresponding to a certain met-subject include YES samples produced using images of the meta-subject and No samples representing things that do not show the meta-subject. Therefore, the SSD values corresponding to a certain meta-subject should be indexed in the database 366 separately from the SSD values corresponding to other meta-subjects.

Accordingly, the SSD computation module performs the SSD between each rectangle/area 359 received and each morphed image 345 of each meta-subject, and outputs the SSD values to the enumeration module for classification into the corresponding multi-dimensional space 363 to calculate the probability using the same approach discussed above.

Figure 5B:
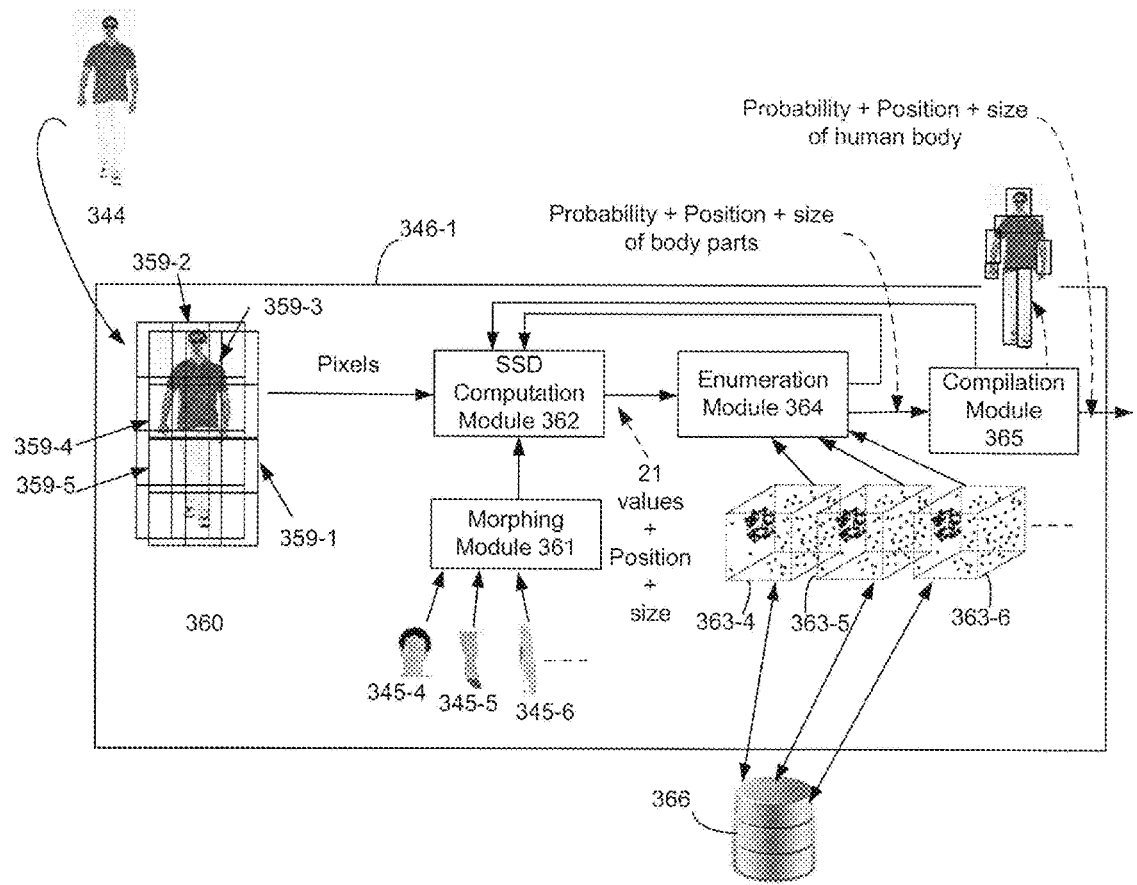
FIG. 5b illustrates a further example of a scanner module adapted to detect a human body by detecting different body parts and assembling them.

In an embodiment, the scenario of FIG. 5a may be used for detecting different body parts of the human body (preferably simultaneously), as exemplified in FIG. 5b. In the example of FIG. 5b, the image 360 is searched for a plurality of meta-subjects. Each rectangle 359 undergoes the same process to be compared with a different meta-subject representing a different body part including but not limited to head, chest, arm, hand, leg etc. For example, as shown in FIG. 5b each one of the rectangles 359-1 to 359-5 is sent the SSD computation module 362 to be compared with images of a head 345-4, a leg 345-5, and a hand 345-6 etc. The SSD values associated with each meta-subject are then sent to the enumeration module 364 to be classified in a multi-dimensional space associated with that meta-subject. For example, multi-dimensional space 363-4 may include sample points for heads, multi-dimensional space 363-5 may include sample points for legs, multi-dimensional space 363-6 may include sample point for arms and so on.

In one scenario, the system may implement the method described above with respect to a single body part, e.g., head, chest, arm, hand, leg etc., or a combination of two or more body parts, e.g., neck and head, hand and head, hand and arm, arm and chest etc., or by compiling major portions of the body such as the torso or the like, or the entirety of the body as exemplified below with respect to the compilation module 365.

In an embodiment, the system may include a compilation module 365 adapted to perform compilation of the human body or a portion thereof using body parts found in the image. For example, when the system finds a match for one of the meta-subjects 345, the compilation module may estimate based on the size and position of the meta-subject in the image and/or a set morphological rules, the position of another meta-subject within the image, and require the system to search the estimated areas for that meta-subject. For example, when the head is found, the system may then estimate the position and size of the chest within the image and proceed to search the estimated position for finding a chest. The compilation module 365 may be configured to assemble the body parts to find the position and size of the human body within the image.

The compilation module 365 may be adapted to dismiss the search if one or more body parts are missing. For example, if a head is found but not a chest or a neck underneath the head, the compilation module may dismiss the search and move to search other rectangles 359.

This method allows for expediting the search and improving the accuracy of the results, by reducing the number of meta-subjects associated with different positions of the human body, e.g., standing position, sitting position, walking, sleeping, etc.

Figure 10:
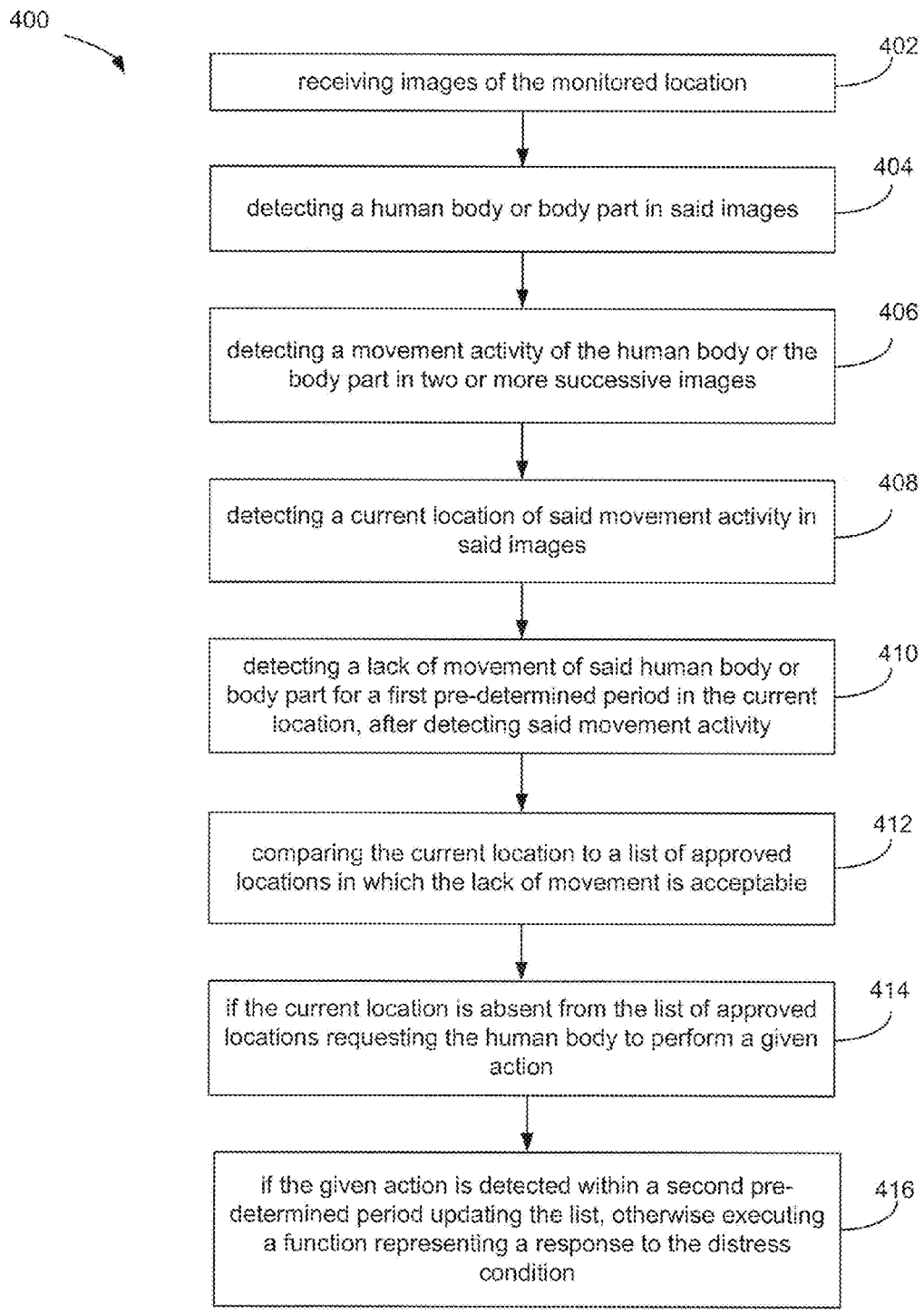
FIG. 10 is a flowchart of vision-based computer implemented method for detecting a distress condition in a monitored location, in accordance with an embodiment.

FIG. 10 is a flowchart of vision-based computer implemented method for detecting a distress condition in a monitored location, in accordance with an embodiment. The method begins at step 402 by receiving images of the monitored location. Step 404 comprises detecting a human body or body part in said images. Step 406 comprises detecting a movement activity of the human body or the body part in two or more successive images. Step 408 comprises detecting a current location of said movement activity in said images. Step 410 comprises detecting a lack of movement of said human body or body part for a first pre-determined period in the current location, after detecting said movement activity. Step 412 comprises comparing the current location to a list of approved locations in which the lack of movement is acceptable. Step 414 comprises if the current location is absent from the list of approved locations requesting the human body to perform a given action. Step 416 comprises if the given action is detected within a second pre-determined period updating the list, otherwise executing a function representing a response to the distress condition.

Figure 11:
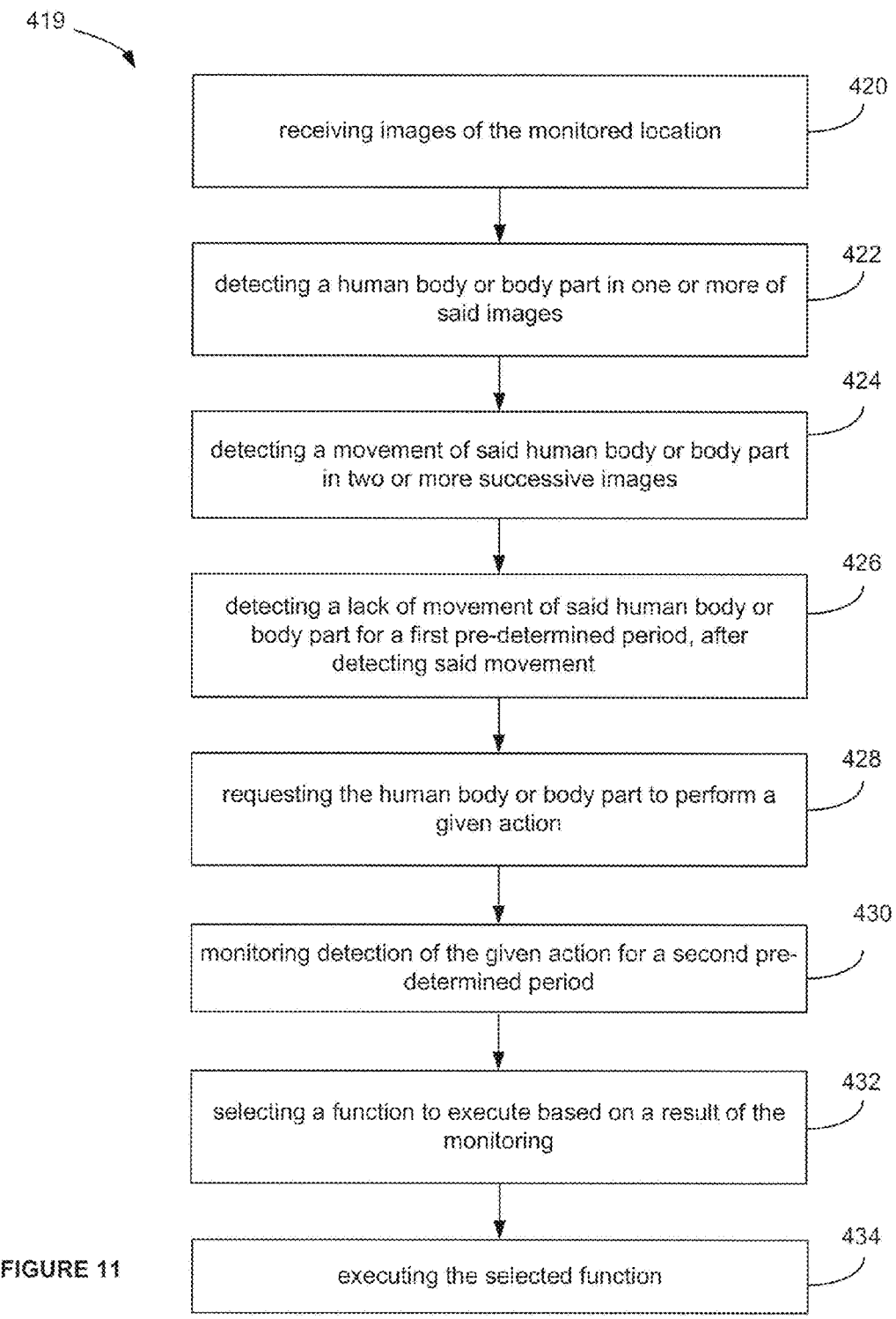
FIG. 11 is flowchart of a vision-based computer implemented method for detecting a distress condition in a monitored location, in accordance with another embodiment.

FIG. 11 is flowchart of a vision-based computer implemented method for detecting a distress condition in a monitored location, in accordance with another embodiment. The method 419 begins at step 420 by receiving images of the monitored location. Step 422 comprises detecting a human body or body part in one or more of said images. Step 424 comprises detecting a movement of said human body or body part in two or more successive images. Step 426 comprises detecting a lack of movement of said human body or body part for a first pre-determined period, after detecting said movement. Step 428 comprises requesting the human body or body part to perform a given action. Step 430 comprises monitoring detection of the given action for a second pre-determined period. Step 432 comprises selecting a function to execute based on a result of the monitoring. Step 434 comprises executing the selected function.

Hardware and Operating Environment

Figure 12:
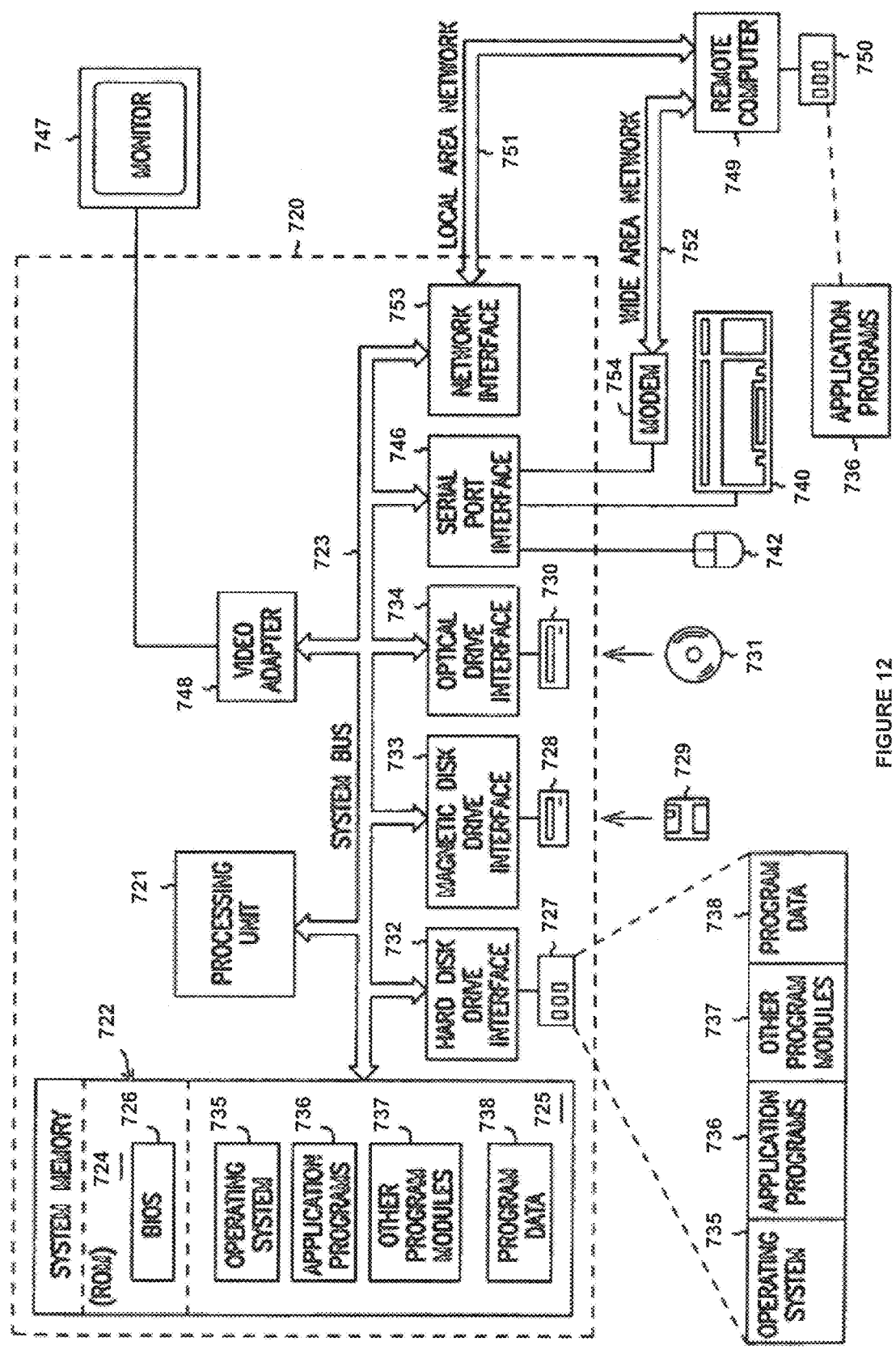
FIG. 12 illustrates an exemplary diagram of a suitable computing operating environment in which embodiments of the invention may be practiced.

FIG. 12 illustrates an exemplary diagram of a suitable computing operating environment in which embodiments of the invention may be practiced. The following description is associated with FIG. 12 and is intended to provide a brief, general description of suitable computer hardware and a suitable computing environment in conjunction with which the embodiments may be implemented. Not all the components are required to practice the embodiments, and variations in the arrangement and type of the components may be made without departing from the spirit or scope of the embodiments.

Although not required, the embodiments are described in the general context of computer-executable instructions, such as program modules, being executed by a computer, such as a personal computer, a hand-held or palm-size computer, Smartphone, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, cellular telephones, smart phones, display pagers, radio frequency (RF) devices, infrared (IR) devices, Personal Digital Assistants (PDAs), laptop computers, wearable computers, tablet computers, a device of the IPOD or IPAD family of devices manufactured by Apple Computer, integrated devices combining one or more of the preceding devices, or any other computing device capable of performing the methods and systems described herein. The embodiments may also be practiced in distributed computing environments where tasks are performed by remote processing devices that are linked through a communications network. In a distributed computing environment, program modules may be located in both local and remote memory storage devices.

The exemplary hardware and operating environment of FIG. 12 includes a general purpose computing device in the form of a computer 720, including a processing unit 721, a system memory 722, and a system bus 723 that operatively couples various system components including the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer; the embodiments are not so limited.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724. In one embodiment of the invention, the computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media. In alternative embodiments of the invention, the functionality provided by the hard disk drive 727, magnetic disk 729 and optical disk drive 730 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the invention, the hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. A user may enter commands and information into the personal computer 720 through input devices such as a keyboard 740 and pointing device 742. Other input devices (not shown) may include a microphone, joystick, game pad, satellite dish, scanner, touch sensitive pad, or the like. These and other input devices are often connected to the processing unit 721 through a serial port interface 746 that is coupled to the system bus, but may be connected by other interfaces, such as a parallel port, game port, or a universal serial bus (USB). In addition, input to the system may be provided by a microphone to receive audio input.

A monitor 747 or other type of display device is also connected to the system bus 723 via an interface, such as a video adapter 748. In one embodiment of the invention, the monitor comprises a Liquid Crystal Display (LCD). In addition to the monitor, computers typically include other peripheral output devices (not shown), such as speakers and printers. The monitor may include a touch sensitive surface which allows the user to interface with the computer by pressing on or touching the surface.

The computer 720 may operate in a networked environment using logical connections to one or more remote computers, such as a remote computer 749. These logical connections are achieved by a communication device coupled to or a part of the computer 720; the embodiments is not limited to a particular type of communications device. The remote computer 749 may be another computer, a server, a router, a network PC, a client, a peer device or other common network node, and typically includes many or all of the elements described above relative to the computer 720, although only a memory storage device 750 has been illustrated in FIG. 7. The logical connections depicted in FIG. 7 include a local-area network (LAN) 751 and a wide-area network (WAN) 752. Such networking environments are commonplace in offices, enterprise-wide computer networks, intranets and the Internet.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer a hand-held or palm-size computer, a computer in an embedded system, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A vision-based computer implemented method for detecting a distress condition in a monitored location, the method comprising:
   receiving images of the monitored location;
   detecting a human body or body part in said images;
   detecting a movement activity of the human body or the body part in two or more successive images;
   detecting a current location of said movement activity in said images;
   detecting a lack of movement of said human body or body part for a first pre-determined period in the current location, after detecting said movement activity;
   comparing the current location to a list of approved locations in which the lack of movement is acceptable;
   if the current location is absent from the list of approved locations requesting the human body to perform a given action;
   if the given action is detected within a second pre-determined period updating the list, otherwise executing a function representing a response to the distress condition.

2. The method of claim 1, wherein requesting comprises generating an audio request using a speaker.

3. The method of claim 1, wherein detecting a lack of movement comprises detecting the human body or body part at the same position in two or more successive images.

4. The method of claim 3, wherein detecting a lack of movement further comprises performing a drift analysis by comparing successive images on a pixel level to detect presence or absence of a breathing movement.

5. The method of claim 1, wherein requesting comprises generating a visible request using a display device.

6. The method of claim 1, wherein the given action is a pronunciation of selected words or tone, the method further comprising receiving an audio signal and processing said audio signal to determine if the audio signal contains the selected words or tone.

7. The method of claim 1, wherein the given action is a gesture, the method further comprising searching for said gesture in said images.

8. The method of claim 1, wherein receiving images of the monitored location comprises receiving two-dimensional (2D) images of the monitored location.

9. The method of claim 1, wherein receiving images of the monitored location comprises receiving a video clip of the monitored location, the video clip comprising a plurality of 2D images.

10. The method of claim 1, wherein detecting a human body or body part comprises comparing a given image of the monitored location with a pre-loaded image of the same or another human body or body part.

11. The method of claim 10, further comprising:
    converting the given image and the pre-loaded image to a binary format;
    dividing the given image into different portions;
    performing a sum of square difference (SSD) between the pre-loaded image and different versions of each portion of the given image, each version having a different resolution, to produce a set of SSD values including m SSD values;
    classifying the set of SSD values as a candidate sample in an m-dimensional space including YES samples representing images showing a human body or body part, and NO samples not showing a human body or body part;
    calculating a probability that the portion includes a human body or body part based on a number of YES samples and NO samples within a pre-defined m-dimensional volume around the candidate sample;
    outputting the position of the human body or body part within the given image if the probability is higher than a predetermined threshold.

12. A vision-based computer implemented method for detecting a distress condition in a monitored location, the method comprising:
    receiving images of the monitored location;
    detecting a human body or body part in one or more of said images;
    detecting a movement of said human body or body part in two or more successive images;
    detecting a lack of movement of said human body or body part for a first pre-determined period, after detecting said movement;
    requesting the human body or body part to perform a given action;
    monitoring detection of the given action for a second pre-determined period;
    selecting a function to execute based on a result of the monitoring; and
    executing the selected function.

13. The method of claim 12, wherein detecting a lack of movement comprises detecting the human body or body part at the same position in two or more successive images.

14. The method of claim 13, further comprising, if the given action is detected, the selected function comprises marking an area surrounding the human body or body part such that if the lack of movement is detected again in that area, no further request is made to the human body or body part to perform the given action.

15. The method of claim 14, further comprising performing a drift analysis including comparing successive images at a pixel level to detect presence or absence of a life indicating movement.

16. The method of claim 15, wherein the life indicating movement includes one or more of: breathing movement in a chest area and movement of body parts.

17. The method of claim 12, further comprising, if the given action is not detected, selecting one or more functions representing a response to the distress condition, and executing said functions.

18. The method of claim 12, further comprising:
   associating a delay of absence with a given aperture/door;
   detecting a disappearance of the human body within said aperture/door;
   if the disappearance of the human body within said door/aperture endures more than the delay of absence, executing a given function associated with distress.

19. A system for detecting a distress condition in a monitored location, the computing device comprising:
   a processor operably connected to a memory device having recorded thereon computer readable statements and instructions which when executed by the processor cause the processor to perform the steps of:
   receiving images of the monitored location;
   detecting a human body or body part in said images;
   detecting a movement activity of the human body or the body part in two or more successive images;
   detecting a current location of said movement activity in said images;
   detecting a lack of movement of said human body or body part for a first pre-determined period in the current location, after detecting said movement activity;
   comparing the current location to a list of approved locations in which the lack of movement is acceptable;
   if the current location is absent from the list of approved locations requesting the human body to perform a given action;
   if the given action is detected within a second pre-determined period updating the list, otherwise executing a function representing a response to the distress condition.

20. The system of claim 19, wherein the given action is a pronunciation of selected words or tone, the system being adapted to receive an audio signal and process said audio signal to determine if the audio signal contains the selected words or tone.

* * * * *